US010186292B1

(12) United States Patent
Krishnamurthy et al.

(10) Patent No.: US 10,186,292 B1
(45) Date of Patent: Jan. 22, 2019

(54) NEAR-FIELD TRANSDUCER HAVING EDGES ALIGNED WITH WAVEGUIDE CORE

(71) Applicant: Seagate Technology LLC, Cupertino, CA (US)

(72) Inventors: Vivek Krishnamurthy, Edina, MN (US); Tae-Woo Lee, Eden Prairie, MN (US); Michael Allen Seigler, Eden Prairie, MN (US); Peng Zhang, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/966,170

(22) Filed: Apr. 30, 2018

(51) Int. Cl.
| G11B 7/00 | (2006.01) |
| G11B 5/60 | (2006.01) |
| G11B 5/31 | (2006.01) |
| G11B 5/48 | (2006.01) |
| G11B 5/00 | (2006.01) |

(52) U.S. Cl.
CPC .......... G11B 5/6082 (2013.01); G11B 5/3136 (2013.01); *G11B 5/4866* (2013.01); *G11B 2005/0021* (2013.01)

(58) Field of Classification Search
CPC .............. G11B 11/05; G11B 11/10508; G11B 11/1051; G11B 11/10506; G11B 2005/0021; G11B 11/10; G11B 11/105; G11B 5/6047
USPC .......................................................... 360/59
See application file for complete search history.

(56) References Cited

U.S. PATENT DOCUMENTS

| 8,000,178 B2 | 8/2011 | Shimazawa et al. |
| 8,351,151 B2 | 1/2013 | Katine et al. |
| 9,558,770 B2 | 1/2017 | Yang et al. |
| 9,620,152 B2 * | 4/2017 | Kautzky .............. G11B 5/3109 |
| 2016/0351222 A1 | 12/2016 | Blaber et al. |

OTHER PUBLICATIONS

Krishnamurthy et al., "Efficient Integrated Light-Delivery System Design for HAMR: Maximal Optical Coupling for Transducer and Nanowaveguide", IEEE Transaction on Magnetics, vol. 52, No. 2, Feb. 2016, 7 pages.
Krishnamurthy et al., "Maximizing Near-Field Plasmonic Transducer Efficiency to its Limit for HAMR", Journal of Lightwave Technology, vol. 34, No. 4, Feb. 2016, pp. 1184-1190.
Singh et al., "Efficient Plasmonic Transducer for Nanoscale Optical Energy Transfer in Heat-Assisted Magnetic Recording", Journal of Lightwave Technology, vol. 32, No. 17, Sep. 1, 2014, pp. 3074-3080.

* cited by examiner

*Primary Examiner* — Nabil Z Hindi
(74) *Attorney, Agent, or Firm* — Hollingsworth Davis, LLC

(57) ABSTRACT

A recording head has a waveguide core layer that delivers light from a light source to a region proximate a magnetic write pole. A near-field transducer is formed of a thin film of Rh or Ir deposited over the waveguide core layer. The near-field transducer includes an enlarged part with two straight edges facing a media-facing surface and at obtuse angles relative to the media-facing surface. A peg extends from the enlarged part towards the media-facing surface. The waveguide core layer has a terminating end with terminating edges that align with the two straight edges of the near-field transducer.

20 Claims, 5 Drawing Sheets

NEAR-FIELD TRANSDUCER HAVING EDGES ALIGNED WITH WAVEGUIDE CORE

SUMMARY

The present disclosure is directed to a near-field transducer with edges that align with a waveguide core. In one embodiment, a recording head has a waveguide core layer that delivers light from a light source to a region proximate a magnetic write pole. A near-field transducer is formed of a thin film of Rh or Ir deposited over the waveguide core layer. The near-field transducer includes an enlarged part with two straight edges facing a media-facing surface and at obtuse angles relative to the media-facing surface. A peg extends from the enlarged part towards the media-facing surface. The waveguide core layer has a terminating end with terminating edges that align with the two straight edges of the near-field transducer.

In another embodiment, a recording head has a waveguide core layer that delivers light from a light source to a region proximate a magnetic write pole. A near-field transducer is formed of a thin film of Rh or Ir deposited over the waveguide core layer. The near-field transducer includes an enlarged part with two straight edges facing a media-facing surface and at obtuse angles relative to the media-facing surface. A side of the enlarged part facing away from the media-facing surface has a concave hollow or a convex bulge. A peg extends from the enlarged portion towards the media-facing surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

One challenge in developing in HAMR products involve unpredictable lifetime of the drives. One cause for this is separation of NFT parts and voiding within regions of the NFT. Also, in order to meet linear density specs, the writer designs may include many optical elements proximate the NFT that can produce potential weak interfaces between different materials, as well as being complex to manufacture.

A HAMR write transducer described below uses a relatively simple structure that can formed from the same material for the entire NFT. This avoids multi-material interfaces that may generate hotspots. Such a design can achieve high thermal gradient (TG), low temperature and good power efficiency. Further, the design can also be incorporated with flat magnetic pole to increase the magnetic field.

Figure 1:
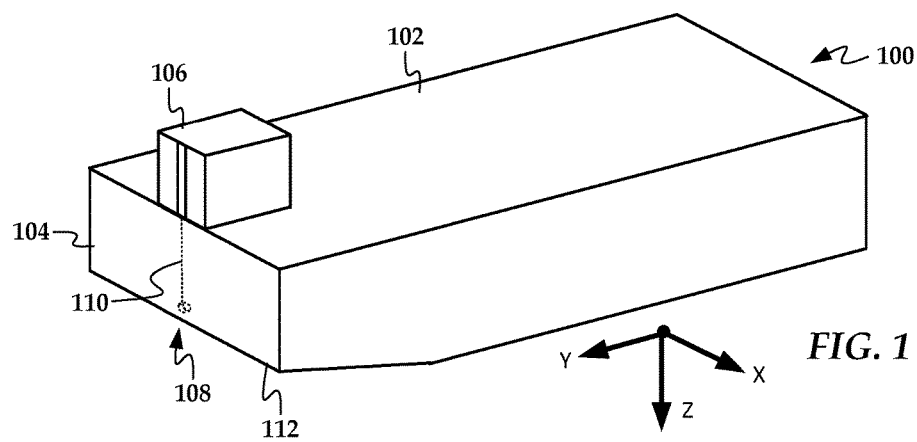
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 to create a small hot spot in the recording medium.

Figure 2:
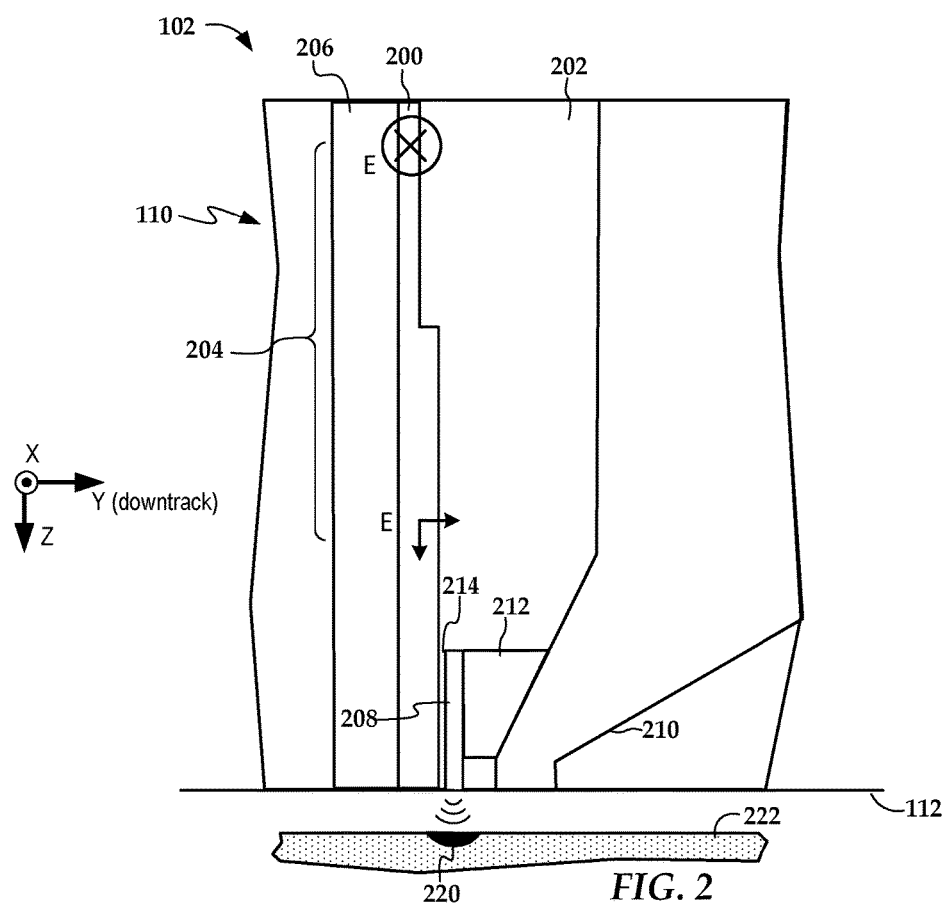
FIG. 2 is a cross-sectional view of a slider along a down-track plane according to according to an example embodiment.

In FIG. 2, a cross-sectional view shows details of a slider body 102 according to an example embodiment. As best seen in FIG. 2, the waveguide 110 includes a core 200, top cladding layer 202, and bottom cladding 206. The waveguide 110 includes a polarization rotator 204 that rotates polarization of light coupled into a waveguide 110, e.g., from a transverse electric (TE) mode to a transverse magnetic (TM) mode, or vice versa. The NFT 208 is placed at the top cladding layer 202 near the waveguide core 200. The cladding layers 202, 206 are each formed of a dielectric material having a refractive index lower than the core 200.

The core 200 delivers light to an NFT 208 that is located within the top cladding layer 202 at the media-facing surface 112 separated from the core 200 via a downtrack gap 214. A write pole 210 is located near the NFT 208. A heat sink 212 thermally couples the NFT 208 to the write pole 210. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

Figure 3:
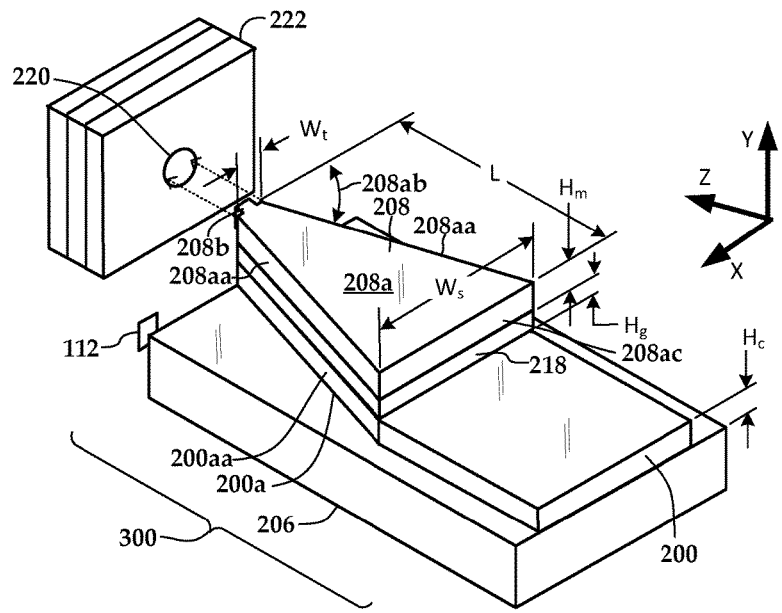
FIG. 3 is a perspective view of a near-field transducer and waveguide according to an example embodiment.

In FIG. 3, a perspective view shows details of the NFT 208 according to an example embodiment. The waveguide core layer 200 delivers light from a light source to a region proximate a magnetic write pole (see pole 210 in FIGS. 4 and 5). The near-field transducer 208 is formed of a thin film of Rh or Ir) that is deposited over the waveguide core layer 200 the near-field transducer includes an enlarged part 208a with two straight edges 208*aa* facing the media-facing surface 112 and at obtuse angles 208*ab* relative to the media-facing surface 112. In this example, the enlarged part 208*a* includes a side 208*ab* that faces away from the media-facing surface 112 and is configured as a flat edge parallel with the media-facing surface 112. A peg 208*b* extends from the enlarged part 208*a* towards the media-facing surface 112. The waveguide core layer 200 has a terminating end 200*a* with terminating edges 200*aa* that align with the two straight edges 208*aa* of the near-field transducer 208.

Figure 4A:
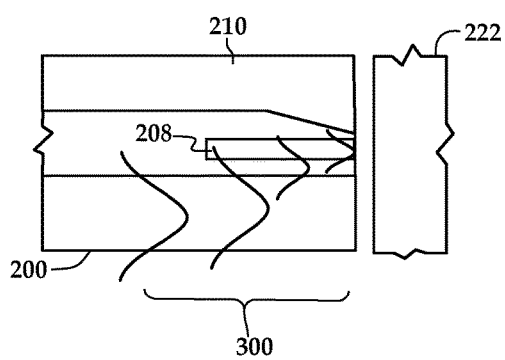
FIGS. 4A and 4B are cross-sectional views of a near-field transducer and write pole according to example embodiments.
Figure 4B:
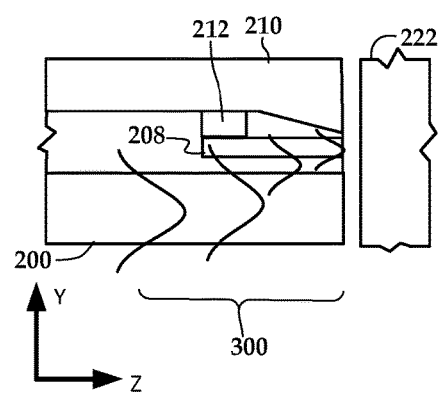

Note that in this view the gap 218 is shown filled with a material (e.g., a dielectric) that is different than that of the core 200 or NFT 208. The gap 218 could be filled with top cladding material (e.g., top cladding 202 seen in FIG. 2) or some other material. The configuration of the core 200 and NFT 208 (e.g., dimensions of NFT 208 and gap 218, matching contours between NFT 208 and core 200, different refractive indices of materials that form the gap 218 and the core layer 200) results in a mode transformation of the light in region 300 before the light is coupled to the NFT 208, as shown in FIGS. 4A and 4B. The mode in the waveguide 110 is transverse magnetic, which is transformed to a metal-guided plasmon mode at the NFT. The embodiment shown in FIG. 4B has heat sink 212 coupled between the NFT 208 and the write pole 210 while there is no similar heat sink shown in FIG. 4A. Analysis shows that this type of heat sink 212 does not significantly impact coupling efficiency of the NFT 208, but can reduce NFT temperature by around 250° C.

In reference again to FIG. 3, a number of analyses were performed to determine optimum geometry for the NFT 208 and surrounding components. The waveguide thickness $H_c$ ranges from 180-300 nm, with smaller values of $H_c$ resulting in high thermal gradient by also high peg temperatures. In various embodiments described herein the waveguide thickness $H_c \approx 220\text{-}300$ nm. The taper length L ranges from 400-600 nm for an NFT base width $W_s$ is around 350 nm, with the best performance seen in the middle of that range (e.g., $L \approx 480\text{-}510$ nm). The length of the peg is around 15-25 nm. For these examples, the NFT thickness $H_m \approx 30$ nm, narrow taper width and peg width can be $W_t \approx 20\text{-}60$ nm, and gap height $H_g \approx 30$ nm.

Figure 5:
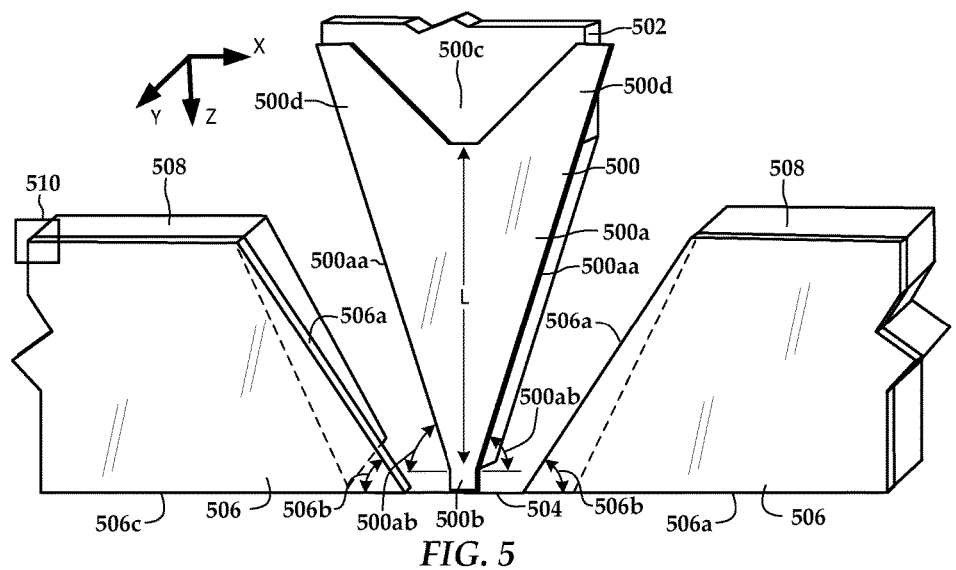
FIGS. 5 and 6 are perspective views of near-field transducers according to example embodiments.

In FIG. 5, a perspective view shows a near-field transducer 500 according to another example embodiment. A waveguide core layer 502 delivers light from a light source to a region proximate a magnetic write pole (not shown) at a media facing surface 504. The near-field transducer 500 is formed of a thin film of Rh or Ir (or other plasmonic material) deposited over the waveguide core layer 502. The near-field transducer includes an enlarged part 502*a* with two straight edges 500*aa* facing the media-facing surface 504 and at obtuse angles 500*ab* relative to the media-facing surface 504. A peg 500*b* extends from the enlarged portion towards the media-facing surface 504. A side of the enlarged part 500*a* facing away from the media-facing surface 504 has a concave hollow 500*c*.

The concave hollow 500*c* can help prevent reflecting light back towards the light source, which can cause instability. In this example, the edges that form the concave hollow 500*c* are piecewise linear, although other shape functions may be used to form the hollow 500*c*, such as circular, parabolic, elliptical, logarithmic, etc. The taper length L may have similar dimensions as the embodiment shown in FIG. 3 (e.g., $L \approx 480\text{-}510$ nm), and "wings" 500*d* resulting from the hollow 500*c* may extend another $\approx 75\text{-}200$ nm away from the media-facing surface 504.

In order to increase thermal gradient of the hotspot, a pair of secondary couplers 506 may be placed on either cross-track side of the near-field transducer 500. The secondary couplers 506 have angled edges 500*a* facing the straight edges 500*aa* of the near-field transducer 500 and media-facing edges 506*c* at the media-facing surface 504. The angled edges are at obtuse angles 500*b* to the media-facing surface 504, and the angles 500*b* may be different than (e.g., less than) the angles 500*ab* of straight edges 500*aa*. The secondary couplers 506 are as thick as or thicker than the near-field transduce 500, and may be made from the same material as the near-field transducer 500, e.g., Rh or Ir. Secondary couplers 506 aid coupling of light from NFT to peg for enhancing thermal gradient.

Generally, fields will radiate around the peg 500*b* due to surface plasmon resonance of the near-field transducer 500. These fields will not penetrate metal of the secondary couplers 506, and so the field intensity around the peg 500*b* is enhanced, ultimately resulting in high thermal gradient. The secondary couplers 506 may be aligned on a substrate-parallel plane 510 with the near-field transducer 500. The secondary couplers 506 are offset in the crosstrack direction from side shields 508 that are also metallic structures. The side shields 508 aid coupling of light from the waveguide to the near-field transducer 500 and also limits stray light from exiting the media facing surface 504 away from the near-field transducer 500. The side shields 508 are much thicker than the secondary couplers 506, and so are spaced away from the near-field transducer 500 to prevent the inhibition of plasmon fields along the straight edges 500*aa*.

Figure 6:
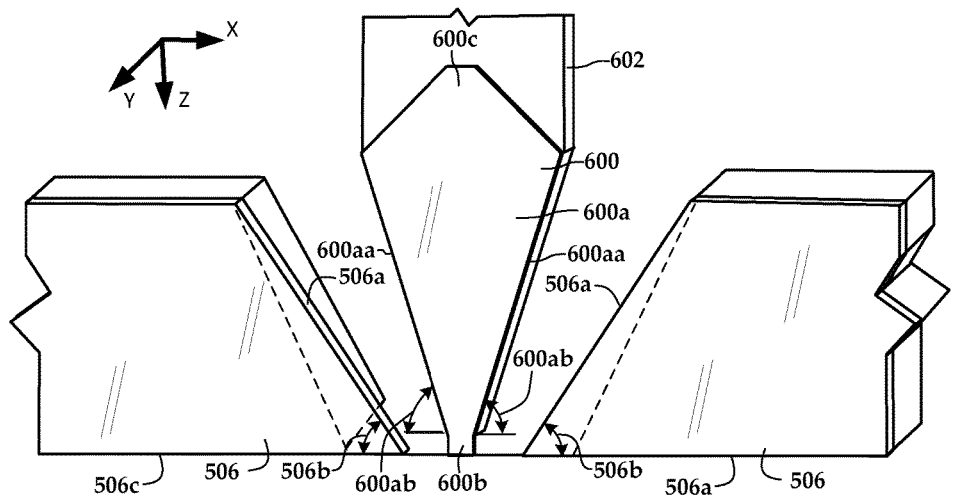

In FIG. 6, a perspective view shows a near-field transducer 600 according to another example embodiment. A waveguide core layer 602 delivers light from a light source to a region proximate a magnetic write pole (not shown) at a media facing surface 604. The near-field transducer 600 is formed of a thin film of Rh or Ir (or other plasmonic material) deposited over the waveguide core layer 602. The near-field transducer 600 includes an enlarged part 600*a* with two straight edges 600*aa* facing the media-facing surface 604 and at obtuse angles 600*ab* relative to the media-facing surface 604. A peg 600*b* extends from the enlarged portion 600*a* towards the media-facing surface 604. A side of the enlarged part 600*a* facing away from the media-facing surface 604 has a convex bulge 600*c*. The convex bulge 600*c* can reduce light reflecting back towards the light source, which can cause instability. In this example, the edges that form the convex bulge 600*c* are piecewise linear, although other shape functions may be used to form the bulge 600*c*, such as circular, parabolic, elliptical, logarithmic, etc.

The near-field transducer 600 may be used with couplers 506 and side shields 508 similar to those shown and described in FIG. 5. The embodiments shown in FIGS. 5 and 6 may also include features shown in the embodiments of FIGS. 2-5. For example, the waveguide core layers 502, 602 may have terminating ends with terminating edges that align with the straight edges 500*aa*, 600*aa* of the near-field transducers 500, 600. The core layers 502, 602 and waveguide core layers 502, 602 may be separated by a downtrack gap similar to gap 218 shown in FIG. 2. Similarly, the couplers 506 and side shields 508 may be used with NFT embodiments shown in FIGS. 2-5.

Figure 7:
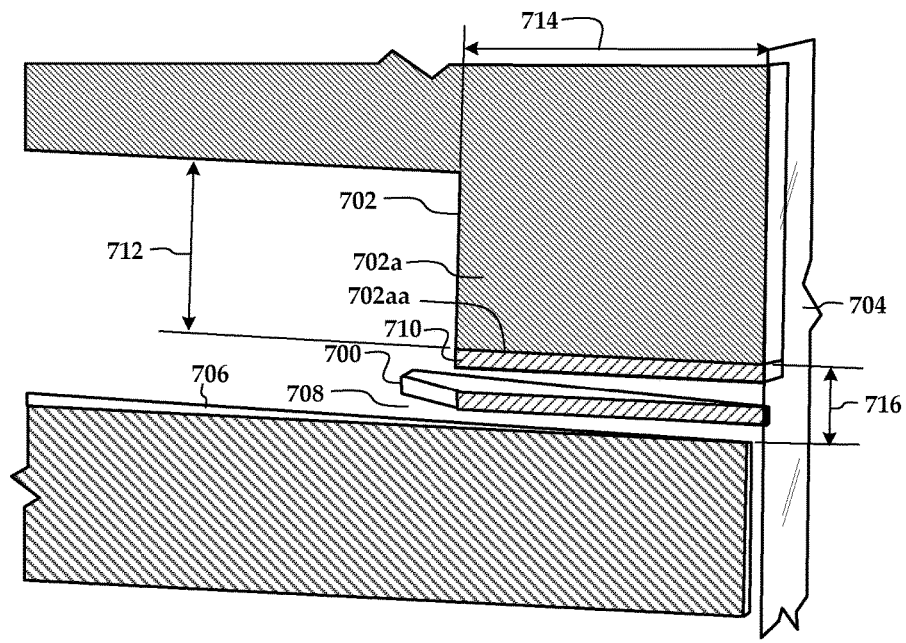
FIG. 7 is a perspective cutaway view of a near-field transducer, waveguide and write pole according to an example embodiment.

While the previous embodiments shown in FIGS. 2, 4A, and 4B show a tapered write pole 210, an NFT according to embodiments disclosed herein may be used with a non-tapered pole. In FIG. 7, a perspective, cut-away view shows an NFT 700 and stepped write pole 702 according to an example embodiment. The NFT 700 in this example is similar to the embodiment shown in FIG. 5, although other geometries may also be used with a similar write pole 702.

The write pole 702 includes a rectangular block 702a at the media-facing surface 704 and proximate the NFT 700. A peg coupler 710 is on a side 702aa of the rectangular block 702a that faces one side of the NFT 700, and may be formed of a similar material as the NFT 700, e.g., Ir or Rh. A waveguide core 706 is located on a side of the NFT 700 opposite the write pole 702, and is recessed from the media-facing surface 704. A gap 708 separates the NFT 700 and waveguide core 706. In some embodiments, the pole step size 712 is ≈100-250 nm, the pole depth 714 is ≈450-550 nm, and the pole-to-core spacing 716 is ≈90-120 nm. One advantage of the stepped write pole 702 is enhanced magnetic field. The relatively larger volume of magnetic material (e.g., block 702a) close to the NFT 700 results in an increase in magnetic field for a given current.

Figure 8:
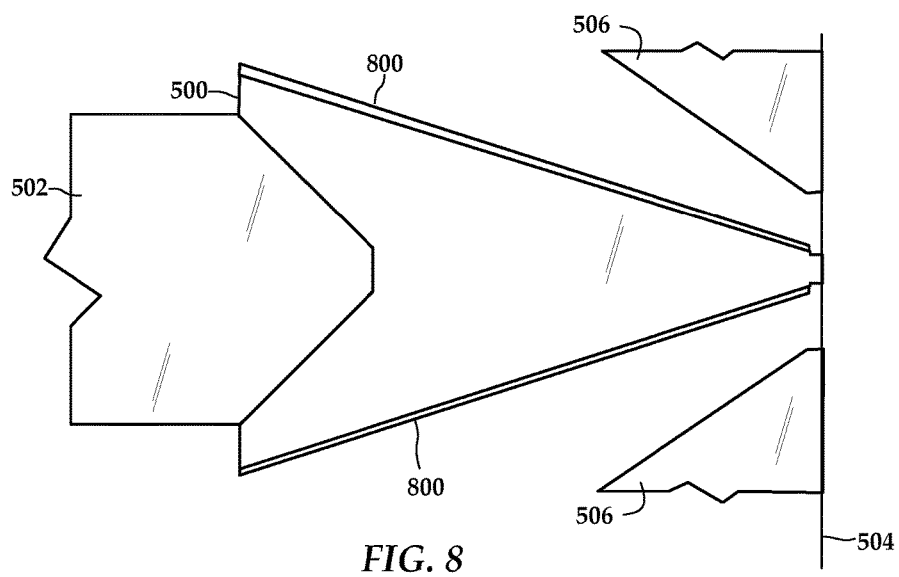
FIGS. 8 and 9 are plan and perspective views of near-field transducers and heat sinks according to an example embodiment.
Figure 9:
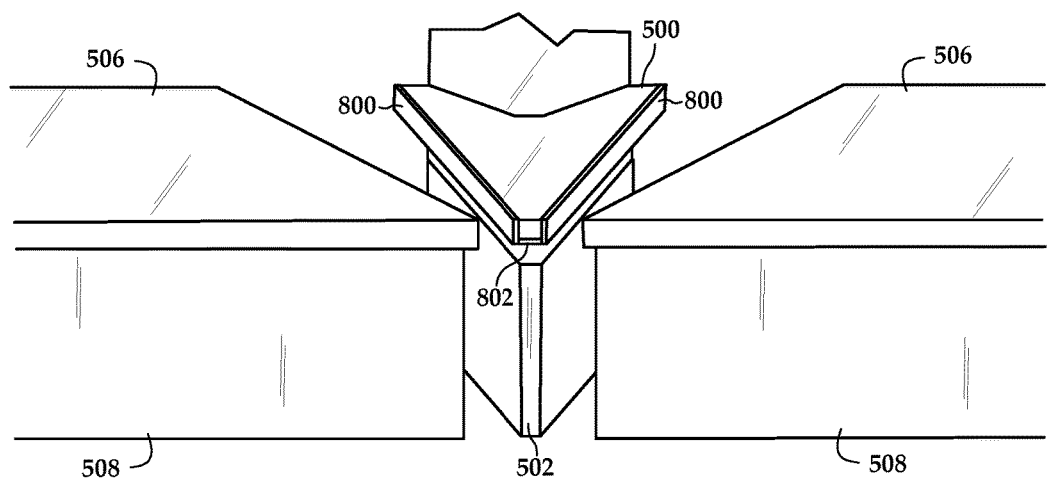

In the above embodiments, thermal gradient can be increased via secondary couplers and the NFT design itself. However, higher thermal gradient generally results in higher peg temperature. Therefore, additional features may be used to reduce NFT temperatures. In FIGS. 8 and 9, plan and perspective views shows heat sinks according to an example embodiment. This example is shown with an NFT 500 and waveguide 502 configured similar to what is shown in FIG. 5, although may be used with other NFT embodiments shown herein. As best seen in FIG. 9, a bottom, planar heat sink layer 802 extends underneath the NFT 500. Side heat sinks 800 extend along sides of the NFT 500.

The planar heat sink 802 is on a side of the NFT 500 that faces away from the write pole (not shown), in contrast to heat sink 212 shown in FIG. 4B. The planar heat sink 802 has a shape that corresponds to that of the NFT 500. The heat sinks 800, 802 are made from a material (e.g., Au, Ag, Al, Cu) different than that of the NFT 600. Note that the heat sinks 800, 802 may also be used with the NFT 300 shown in FIG. 3, and one heat sink 800, 802 may be used without the other heat sink 800, 802.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
   a waveguide core layer that delivers light from a light source to a region proximate a magnetic write pole;
   a near-field transducer formed of a thin film of Rh or Ir deposited over the waveguide core layer, the near-field transducer comprising:
      an enlarged part with two straight edges facing a media-facing surface and at obtuse angles relative to the media-facing surface; and
      a peg extending from the enlarged part towards the media-facing surface, the waveguide core layer having a terminating end with terminating edges that align with the two straight edges of the near-field transducer.

2. The recording head of claim 1, wherein a side of the enlarged part facing away from the media-facing surface comprises a flat edge parallel with the media-facing surface.

3. The recording head of claim 1, wherein a side of the enlarged part facing away from the media-facing surface comprises a concave hollow.

4. The recording head of claim 1, wherein a side of the enlarged part facing away from the media-facing surface comprises a convex bulge.

5. The recording head of claim 1, further comprising first and second heat sinks along the two straight edges.

6. The recording head of claim 5, further comprising a planar heat sink on a side of the near-field transducer that faces away from a write pole of the recording head, the planar heat sink joined with the first and second heat sinks.

7. The recording head of claim 1, further comprising a planar heat sink on a side of the near-field transducer that faces away from a write pole of the recording head.

8. The recording head of claim 1, further comprising first and second secondary couplers aligned on a downtrack plane with the near-field transducer and each having angled edges that face the respective two straight edges of the enlarged portion.

9. The recording head of claim 1, further comprising a downtrack gap between the waveguide core layer and the near-field transducer, the downtrack gap filled with a dielectric.

10. The recording head of claim 1, wherein the waveguide core layer and the near-field transducer are configured to perform a mode conversion of the light before the light couples with the near-field transducer.

11. The recording head of claim 1, further comprising a write pole, the write pole having a rectangular block at the media-facing surface and proximate the near-field transducer.

12. The recording head of claim 11, further comprising a peg coupler on a side of the rectangular block that faces the near-field transducer, the peg coupler formed from the same material as the near-field transducer.

13. A recording head, comprising:
   a waveguide core layer that delivers light from a light source to a region proximate a magnetic write pole;
   a near-field transducer formed of a thin film of Rh or Ir deposited over the waveguide core layer, the near-field transducer comprising:
      an enlarged part with two straight edges facing a media-facing surface and at obtuse angles relative to the media-facing surface, a side of the enlarged part facing away from the media-facing surface comprising a concave hollow; and
      a peg extending from the enlarged portion towards the media-facing surface.

14. The recording head of claim 13, wherein the waveguide core layer comprises a terminating end with terminating edges that align with the two straight edges of the near-field transducer.

15. The recording head of claim 13, wherein the waveguide core layer and the near-field transducer are configured to perform a mode conversion of the light before the light couples with the near-field transducer.

16. The recording head of claim 13, further comprising first and second secondary couplers aligned on a downtrack plane with the near-field transducer and each having angled edges that face the respective two straight edges of the enlarged portion.

17. A recording head, comprising:

a waveguide core layer that delivers light from a light source to a region proximate a magnetic write pole;

a near-field transducer formed of a thin film of Rh or Ir deposited over the waveguide core layer, the near-field transducer comprising:

an enlarged part with two straight edges facing a media-facing surface and at obtuse angles relative to the media-facing surface, a side of the enlarged part facing away from the media-facing surface comprising a convex bulge; and a peg extending from the enlarged portion towards the media-facing surface.

18. The recording head of claim 17, wherein the waveguide core layer comprises a terminating end with terminating edges that align with the two straight edges of the near-field transducer.

19. The recording head of claim 17, wherein the waveguide core layer and the near-field transducer are configured to perform a mode conversion of the light before the light couples with the near-field transducer.

20. The recording head of claim 17, further comprising first and second secondary couplers aligned on a downtrack plane with the near-field transducer and each having angled edges that face the respective two straight edges of the enlarged portion.

* * * * *